United States Patent [19]

Li et al.

[11] Patent Number: 5,221,439
[45] Date of Patent: Jun. 22, 1993

[54] ORBITAL TUBE EVAPORATOR WITH IMPROVED HEAT TRANSFER

[75] Inventors: Yao-Tzu Li, Lincoln; Henry Huang, Acton; I-Chieng Ho, Concord, all of Mass.; Albert P. Yundt, Jr., Nashua, N.H.

[73] Assignee: Y. T. Li Engineering, Inc., Acton, Mass.

[21] Appl. No.: 716,083

[22] Filed: Jun. 17, 1991

[51] Int. Cl.⁵ .................................................. B01D 1/22
[52] U.S. Cl. ................................. 202/175; 202/176; 202/185.1; 202/182; 202/205; 202/236; 202/237; 202/267.1; 159/13.2; 159/24.1; 159/DIG. 31; 203/11; 203/26; 203/86
[58] Field of Search ............... 202/182, 175, 202, 236, 202/205, 267.1, 237, 238, 172, 185.1, 185.3, 185.4; 203/26, 86, 11, 89, 72; 159/13.2, DIG. 31, 900, 24.1, 24.2, 27.1

[56] References Cited

U.S. PATENT DOCUMENTS

| | | | |
|---|---|---|---|
| 2,575,690 | 11/1951 | Smith | 202/153 |
| 2,884,050 | 4/1959 | Brownell | 159/6.1 |
| 2,894,879 | 7/1959 | Hickman | 203/27 |
| 2,955,990 | 10/1960 | Smith | 202/236 |
| 3,175,962 | 3/1965 | Holtslag | 202/236 |
| 3,190,817 | 6/1965 | Neugebauer et al. | 202/236 |
| 3,206,381 | 9/1965 | Neugebauer et al. | 202/185.1 |
| 3,244,601 | 4/1966 | Diedrich | 202/236 |
| 3,265,115 | 8/1966 | Maier | 159/13.4 |
| 3,271,272 | 9/1966 | Watt | 202/236 |
| 3,570,589 | 3/1971 | Biesinger | 202/185.1 |
| 3,788,954 | 1/1974 | Cantrell | 202/185.1 |
| 3,803,001 | 4/1974 | Carnavos | 202/185.1 |
| 3,960,668 | 6/1976 | Rush | 202/185.1 |
| 4,226,669 | 10/1980 | Vilardi | 159/6.1 |
| 4,230,529 | 10/1980 | Li | 202/175 |
| 4,249,989 | 2/1981 | Kalmykov et al. | 159/10 |
| 4,441,963 | 4/1984 | Li | 202/172 |
| 4,504,361 | 3/1985 | Tkac et al. | 202/172 |
| 4,586,985 | 5/1986 | Ciocca et al. | 202/174 |
| 4,618,399 | 10/1986 | Li | 159/6.2 |
| 4,762,592 | 8/1988 | Li | 202/172 |
| 4,770,748 | 9/1988 | Cellini et al. | 202/185.1 |
| 4,878,535 | 11/1989 | Rosenblad | 202/185.1 |

*Primary Examiner*—Wilbur Bascomb, Jr.
*Attorney, Agent, or Firm*—Wolf, Greenfield & Sacks

[57] ABSTRACT

An orbital evaporator has a vertical heat transfer tube or tubes mounted in a container driven in an orbital motion. A stiff whip rod is freely movable within the tube. Its lower end rests on a horizontal plate. The orbital motion causes the rod to roll over the interior surface of the tube to distribute the liquid in a thin film and to control fouling. A set of fins is mounted on the exterior of the tube to collect and channel the condensate to improve heat transfer through the tube. The fins are preferably longitudinal and the whip rod is preferably hydrophobic. Operating the evaporator with boiling temperatures substantially below 100° C. in combination with the fins and a rolling whip rod allows operation as a desalinization unit for an indefinite period of time with a high total heat transfer coefficient. The evaporator preferably also includes a degasser to control the formation of a gas barrier at the exterior surface of the tube.

10 Claims, 3 Drawing Sheets

ORBITAL TUBE EVAPORATOR WITH IMPROVED HEAT TRANSFER

BACKGROUND OF THE INVENTION

This invention relates in general to evaporation and distillation apparatus of the orbital or "wobbling" type. More specifically, it relates to an improved evaporator with systems to decrease thermal resistance at the condensing and evaporation surfaces of a heat transfer tube and to control thermal resistance due to fouling at the evaporation surface Evaporation and distillation apparatus of the orbital tube type are described in U.S. Pat. Nos. 4,230,529; 4,441,963; 4,618,399; and 4,762,592 to one of the present applicants. The evaporators in these patents have a container that holds one or more vertically oriented heat transfer tubes. The tubes are smooth surfaced, circular in cross section, open at both ends, and made of a material with good heat conductivity properties. A distributor directs a feed liquid to the interior of each tube. The orbital motion spreads the liquid into a film. Heat transferred radially through the wall of the tube evaporates a portion of the feed liquid into a vapor stream. In one form of evaporator, a compressor draws the evaporated vapor from a vapor chamber, compresses it, and then discharges the vapor to a condensation chamber. The compressor and partitions isolate the condensation chamber from the vapor chamber open to the interior of the tubes. The compression heats the vapor, resulting in a condensing temperature outside the tubes higher than the boiling temperature inside the tubes. Condensation of the vapor releases heat which is used to produce the evaporation. The container has an outlet for the condensate which collects near the bottom of the container.

The '963 patent, in part, describes a rigid bar that is positively driven to rotate within the tube to spread viscous liquids into a thinner, more evenly distributed film than would be possible relying solely on the orbital motion to distribute the liquid. The '399 patent describes a whip rod located in the tube which spreads the feed liquid, of any viscosity, into a highly thin and uniform film to reduce its thermal resistance and to enhance its evaporation. The whip rod also removes scales and other solid residue of evaporation that can foul the interior surface and impede the heat transfer through the tube. The '399 patent discloses several arrangements for mounting the rod, including lengths of cables, a flexible, but non rotating anchor connected between a base and the lower end of the rod, and a double universal joint also connected between the lower end of the whip rod and the base. While the whip rod has proven to be quite effective as a film distributor, the mounting arrangements have disadvantages. They increase the overall material, assembly and operating costs. Also, they fail. Material fatigue of flexible cables supporting the whip rods is a particular concern.

More generally, the combination of an orbiting vertical heat transfer tube and a whip rod is intended to facilitate the transfer of the heat of condensation at the exterior surface of the tube to the interior surface where it drives the evaporation. The effectiveness of this heat transfer through the tube is expressed as the total heat transfer coefficient U, which in turn can be expressed as the reciprocal of the thermal resistances to this flow as follows:

$$U = \frac{1}{R_e + R_w + R_c + R_f}$$

where
- $R_e$ = thermal resistance of the evaporation side of the tube wall
- $R_w$ = thermal resistance of the wall
- $R_c$ = thermal resistance of the condensing side of the tube wall
- $R_f$ = the thermal resistance due to the accumulation of solids deposited upon the tube surface after extended use.

The known whip rod reduces $R_e$ and $R_f$. However, an important and often limiting factor on the ultimate effectiveness of such orbital evaporators is $R_c$. This thermal resistance is due principally to the accumulation of condensate and to any non condensible gases carried by the vapor to the exterior wall of the tube.

Heretofore flow of the condensate has depended on the force of the orbiting motion and on gravity. In practice a substantial thickness of condensate sheet can develop, particularly at the lower end of the tube. Heretofore in orbital tube evaporators there has been no arrangement to reduce the $R_c$ of the accumulated condensate layer.

It is therefore a principal object of this invention to improve the efficiency of orbital tube evaporation/distillation apparatus by providing a reduction in the thermal resistance at the condensing surface of the tube.

Another principal object is to provide a system for controlling the thermal resistance at the evaporation surface of the tube due to the presence of the feed liquid and fouling.

Another principal object is to provide the foregoing advantages at a low cost of manufacture and in a manner that is compatible with the operation of known evaporators of the orbital tube type.

A further object is to provide an improved whip rod and whip rod mounting arrangement that avoids flexible cables, anchors and universal joints to decrease the cost and to enhance the reliability of the evaporator.

Still another object is to provide an improved evaporator with all of the foregoing advantages which is also compact.

A still further object of this invention is to provide an orbital tube evaporator and method of operation which controls fouling to a degree that the evaporator can be operated for an indefinite period of time, that is, without periodic shut downs to clean fouled tubes, particularly in connection with the desalinization of seawater.

SUMMARY OF THE INVENTION

An orbital tube evaporator has a container that holds at least one, and typically several, open-ended heat transfer tubes within the container in a vertical orientation. An orbital drive circulates (without rotation) the container and the tubes in unison. A feed liquid inlet, which preferably includes a degasser, directs a supply of the feed liquid into the container. A distributor dispenses the liquid equally among the tubes, directing it along their interior surfaces at an upper end of the tube so that gravity aids in spreading the liquid over the interior surface. Heat carried through the tube from its exterior evaporates the liquid at the interior surface creating a vapor stream. The heat applied to the exterior of the tube derives from the condensation of vapor at a temperature a few degrees higher than the temperature of evaporation inside the tubes. Vapor may be supplied to the exterior of the tube from an outside source. Alternatively, a compressor may be used to compress the vapor collected from the tubes in a vapor chamber and feed it, at an elevated temperature, to a condensation chamber open to the exterior of the tube or tubes. Regardless of the source of the vapor, it condenses on the exterior of the tubes. Condensate collects at the bottom of the container and flows to a condensate outlet.

The heat transfer tubes have fins mounted on their exterior surface to collect and channel the condensate. The fins are elongated to extend generally the full height of the tube. There preferably are plural fins mutually spaced from one another circumferentially. The fins can be oriented vertically along the axis of the tube, or at an inclination to form a set of parallel spirals. Longitudinal fins are preferred.

A whip rod is disposed in each tube. The rod has a circular cross section and extends generally the full height of the tube. It has sufficient stiffness to be self-supporting when stood on end. The rod is preferably formed of a hydrophobic material such as nylon, polytetrafluoroethylene (PTFE), or acetal. The rod is not anchored or otherwise mechanically connected to the tube, the container, or any other component mounted in the container. The rod rests on a plate extending horizontally under the bottom open end of the associated tube. In operation, the orbital motion drives the rod around the interior surface of the tube in a free rolling motion. Unevaporated feed liquid exiting the bottom of the tube lubricates the support plate. A portion of the unevaporated feed liquid is preferably recycled by pumping it back to the feed liquid inlet.

When operated with a nylon whip rod, the exterior fins, and a clean tube, then it is possible to achieve a total heat transfer coefficient U of at least 2,500 BTU/ft$^2$-hr-° F., roughly 150% of the maximum value achievable with orbital tube evaporators of the prior art, even those using conventional whip rods. For sea water desalinization, when the evaporator is operated with boiling temperatures below 68° C., the U factor can be maintained above 2,000 indefinitely.

These and other features and objects of the present invention will be more readily understood from the following detailed description which should be read in light of the accompanying drawings.

DETAILED DESCRIPTION OF THE PREFERRED EMBODIMENTS

Figure 1:
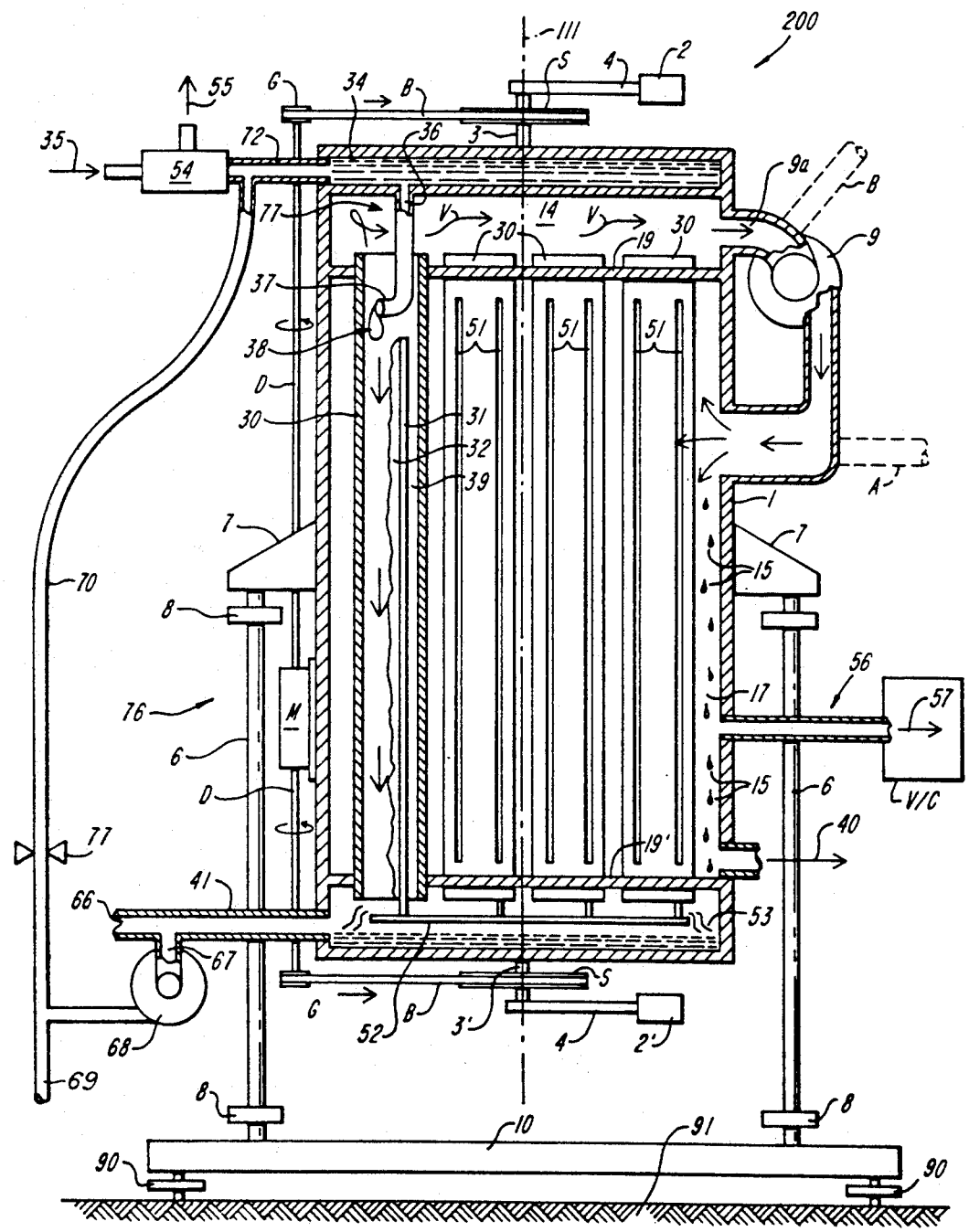
FIG. 1 is a view in vertical section of an improved orbital tube evaporator according to the present invention.

FIG. 1 shows the basic construction of an orbital evaporator and distillation apparatus 200 operating in the vapor compression mode and constructed according to the present invention. The same system can be operated in other modes without a compressor, but with a vapor inlet $A_{in}$ and a vapor outlet $B_{out}$, as shown in phantom in FIG. 1, and with suitable modifications of the interior structure of the evaporator to isolate the vapor inlet from the vapor outlet. Various evaporation and distillation systems, for example, are shown and described in U.S. Pat. No. 4,441,963, the disclosure of which is incorporated herein by reference. A number of evaporation tubes 30, also referred to herein as heat transfer tubes, are assembled inside the evaporator housing or container 1.

The entire evaporator 200 is suspended by the struts 6 and driven into orbital motion by the rotation of the counter weights 2 and 2'. The struts 6 attach through laterally yieldable couplings 8 to brackets 7 secured to the outside of the housing 1. The brackets 7 lie in a common horizontal plane perpendicular to a central vertical axis 111 of the evaporator 200. The lower end of each strut also attaches through an associated coupling 8 to a base 10. Suitable couplings are described in the aforementioned U.S. Pat. No. 4,762,592, the disclosure of which is incorporated herein by reference. Leveling screws 90 provide a convenient arrangement for providing the entire evaporator with a proper level orientation, despite vertical variations in "ground" 91. FIG. 1 illustrates one of many possible arrangements for rotating the counterweights 2,2', namely, a conventional electric motor M mounted on the exterior of the housing 1 operating a drive shaft D, gears G,G and timing belts B,B which each engage a sprocket S,S on shafts 3,3'. The motor thereby rotates the shafts 3,3' in unison, which rotates arms 4,4 and counterweights 2,2' mounted on the arms. This strut and yieldable coupling suspension in combination with this counterweight system provides an orbital drive system 76.

The evaporator housing has four interior chambers, a feed water manifold 34, a vapor collection chamber 14, a condensing chamber 17 and a residue chamber 16 at the bottom. Feed water exits the manifold via feed distribution tubes 36 each feeding a nozzle 37 that produces a tangential stream 38 of the feed liquid to the exterior of an associated tube at its upper end. Unevaporated residue exits via conduit 41. Condensate exits via conduit 40, shown schematically as a flow arrow.

The stream 38 of feed liquid inside each tube is pushed by a revolving whip rod 31 into a downflow wave front 32 while leaving a thin film 39 behind the whip rod. The vapor V generated by the evaporation of the thin film will flow upwardly into the vapor collection chamber 14 and then into the intake 9a of a compressor 9. (In some configurations it may be desired to induce a downward vapor flow.) The compressed vapor, with a rise in temperature of ΔT, will flow into the condensing chamber 17 outside the evaporation tubes 30. A pair of internal horizontal partition walls 19,19' support the tubes and isolate the vapor collection chamber 14 from the condensation chamber 17, except for the flow path through the compressor 9. Because of the temperature difference, the vapor in the chamber 17 will form condensation upon the outside surface of the tubes 30. The heat of condensation thus released will transfer across the tube wall to evaporate the liquid film 39 and complete the cycle. The temperature gradient $\Delta T$ is the thermal driving force needed to transfer the heat across the tube wall. Electrical energy is commonly used by the compressor to create $\Delta T$. The thermal resistance along the heat transfer path will determine the relationship between $\Delta T$ and the amount of heat transferred and therefore the amount of distillation produced.

Figure 2:
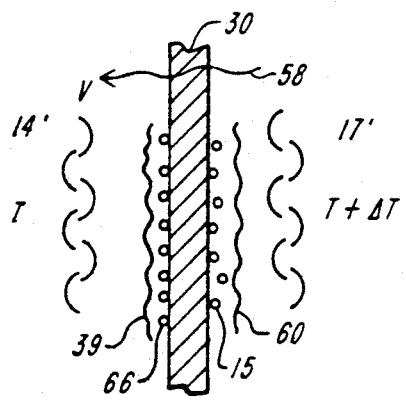
FIG. 2 is a detailed view in vertical section across a heat transfer surface of the heat transfer tubes shown in FIG. 1.

FIG. 2 illustrates the cross sectional view of one of the heat transfer tubes 30 with the righthand side of the tube wall identified as the condensing side 17' (with a temperature $T + \Delta T$) and the lefthand side of the tube wall identified as the evaporation side 14' (with a temperature T). Heat flux 58 is driven to flow across the tube surface by the temperature gradient $\Delta T$ against the thermal resistance $R_c$, $R_w$, $R_f$ and $R_e$, as defined above.

On the condensing side 17' the vapor in chamber 17 would move toward the wall to condense and then to form a continuous film with droplets 15 which offers part of the thermal resistance $R_c$. If there are some non-condensible gases mixed with the vapor in chamber 17 these gases will be carried by the movement of the vapor toward the tube surface to form a blanket layer 60 which further increases the thermal resistance $R_c$ on the evaporation side. The thermal resistance $R_e$ is reduced by the thinness of the fluid film 39, but resistance on the vapor side 14' may be increased by the deposit of solid residue 66 (fouling) on the tube wall as a result of the evaporation process.

Figure 3:
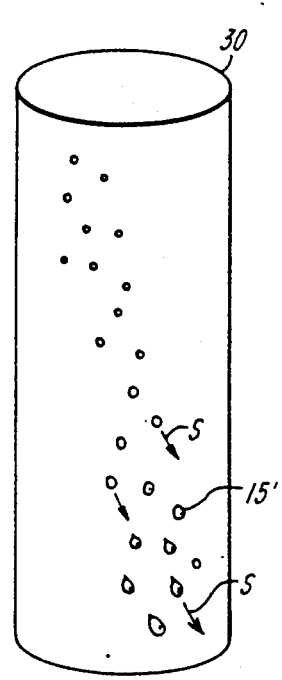
FIG. 3 is a perspective view of a prior art heat transfer tube illustrating the growth of droplets on the condensate film surface on the outside surface of the tube.

FIG. 3 shows the general growth and movement of the condensate droplets 15 formed on the condensate film surface on a smooth surfaced tube 30 as used in prior art orbital evaporators. The size of the droplets increases as they move downward in a spiral path S influenced by the orbital motion of the tube and gravity. In a multi tube system some of the droplets may be thrown off to land upon the adjacent tube. The total effect is an ever increasing thickness of a downward flowing sheet of condensate with the thickness of the sheet determined by the balance between the shear rate of the flow upon the surface and the gravitational pull on the droplets and the sheet. The longer the tube, the thicker the sheet, and hence the higher the value of the thermal resistance $R_c$.

Figure 4:
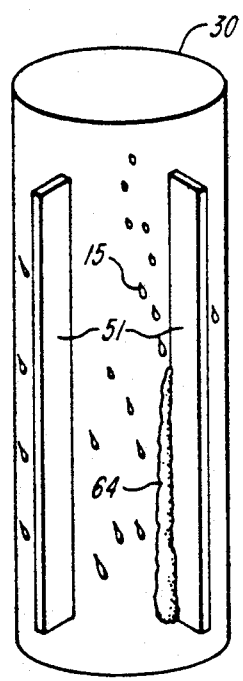
FIG. 4 is a view corresponding to FIG. 3 showing a heat transfer tube according to the present invention as shown in FIG. 1 which collects condensate along the side of the fin and channels it.

FIG. 4 illustrates one form of a principal feature of the present invention, the addition of fins 51 on the outside surface of each tube 30. As shown, the fins have a generally rectangular cross section and extend generally the length of the tube. They are preferably formed of the same material as the tube, whether integrally or in multiple pieces with the fins welded, cemented, brazed or otherwise secured to the tube. The radial height of the fins should be sufficient to perform the collecting and channeling function discussed below, but not so large as to adversely affect the role of the tubes 30 as the surface where condensation occurs. The fins are preferably plural and uniformly spaced circumferentially around the tube. The precise number and spacing will depend on factors such as the tube diameter, the viscosity of the condensate, the rate of production of condensate and the level of force generated by the orbital motion.

Droplets 15 moving spirally downward on the tube are intercepted by the fins and channeled by the fin acting in cooperation with the outside surface of the tube to flow downwardly in a stream 64. In this manner the tube surface is less clustered by the lingering droplets 15. This results in a reduction of $R_c$ and the increase of the U factor.

Figure 5:
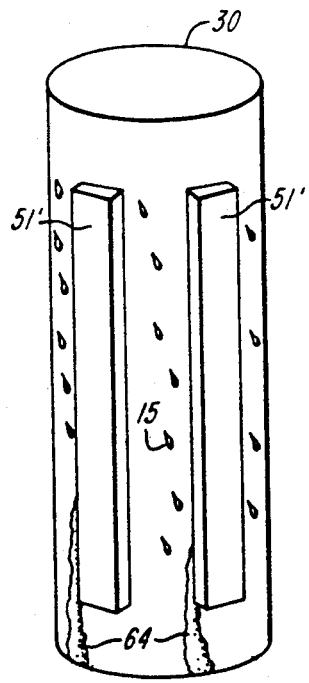
FIG. 5 is a view corresponding to FIGS. 3 and 4 showing an alternative embodiment where the fin has significant width in comparison to the height to facilitate fabrication by a metal drawing process.
Figure 6:
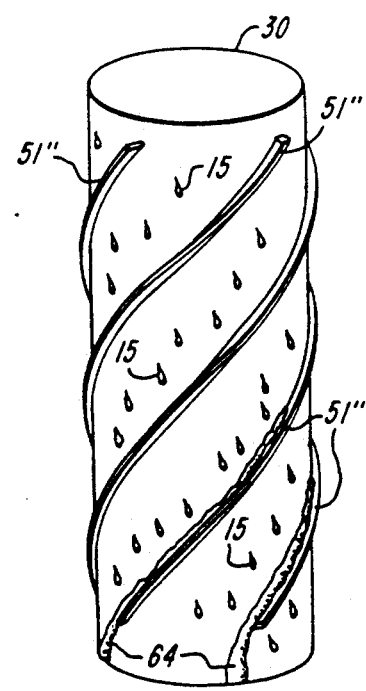
FIG. 6 is a view corresponding to FIGS. 4 and 5 showing an alternative embodiment where the fins are spiral shaped.

FIG. 5 and 6 show two alternative configurations of the fins 51' and 51". These alternative configurations may be adopted more from a manufacturing point of view rather than minor improvement of the drainage capability. In FIG. 5 the fins 51' are laterally thicker than those in FIG. 4 to facilitate drawing of a tube with integrally formed fins. In FIG. 6 the fins 51" spiral.

To minimize the blanketing effect of the non-condensible gas 60 (FIG. 2), gases must be removed continuously. This can be accomplished by the measures as shown in FIG. 1. The first measure is to use a conventional degasser 54 before the feed liquid 35 enters a distribution system at the top of the housing 1 including a feed water manifold 34 and a set of distribution tubes 36 each extending into the upper end of one of the tubes 30. The gas thus removed will be carried away at exit 55 into some suitable discharge system such as a vacuum pump. The second measure is to vent the condensing chamber 17 through a vent tube 56. Again the discharge 57 will normally be connected to a discharge system such as a vacuum pump or vacuum condensing unit V/C as shown in FIG. 1.

The above two methods of removing non condensing gases are common practice for evaporation systems. However they are even more important for orbital evaporator because of the high U factor achievable. In the present invention, the effective use of gas removal system is necessary to fully develop the potential of the orbital evaporator.

Figure 7:
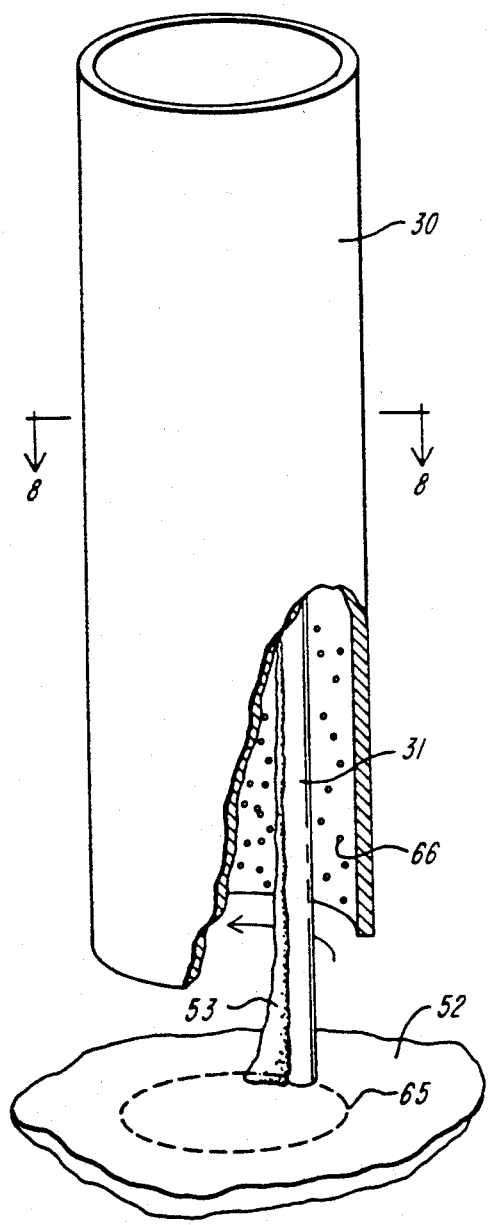
FIG. 7 is a detailed view in perspective with portions broken away of a free rolling whip rod according to the present invention as shown in FIG. 1.

FIG. 7 shows another principal feature of the present invention, a free rotating whip rod 31 with its lower end sliding over a smooth horizontal plate 52 along a circular path 65. Since the surface of plate 52 is constantly washed by the unevaporated discharge fluid 53 from tube 30, there is sufficient lubrication action to minimize the wear of either the rod or the plate. While the support plate 52 is shown as a solid, continuous plate, it will be understood that a variety of other arrangements can be used to provide a horizontal support surface for the whip rods 31. For example, each tube 30 can have a small plate located under the tube to support one rod 31 in that tube. The support can also be provided by a block or non plate configuration.

Figure 8:
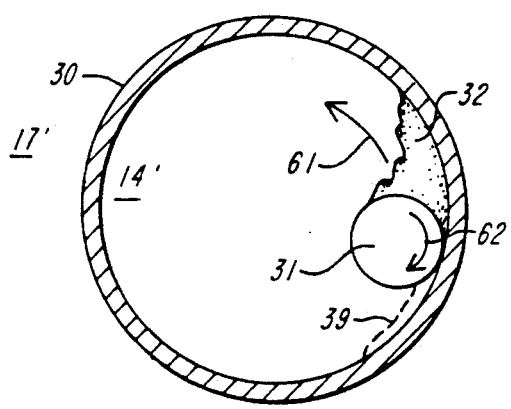
FIG. 8 is a detailed view in horizontal section along the line 8—8 of a free rolling whip rod in operation.

FIG. 8 shows a detailed end view of the whip rod 31 inside the tube 30. The rod is pushed into a revolving motion 61 by the orbital motion of tube 30. Since the rod in this configuration is neither hinged nor anchored as in the configuration disclosed in U.S. Pat. Nos. 4,618,399 and 4,762,592 (the disclosures of which are incorporated herein by reference), it will rotate inside the tube 30 as shown by the arrow 62 with no sliding motion between them, but rather with a rolling motion about its own central longitudinal axis. In this manner wear is minimized without the need of the benefit of the hydrodynamic lift as considered in these two prior art patents.

Principal advantages of this configuration is lower cost and better reliability in comparison to the hinge (FIG. 4 of U.S. Pat. No. 4,618,399) and flexible anchorage (FIG. 6 of U.S. Pat. No. 4,618,399 and FIG. 11 of U.S. Pat. No. 4,762,592) arrangements. In eliminating the hinge or the flexible anchorage, a first benefit is a greatly enhanced ease in installing the whip rods with attendant cost advantages.

Among the various parameters of the whip rod such as diameter, weight, and surface property, it has been found that only the surface property plays a significant role. Rods formed of nylon, PTFE, or acetal exhibit a significantly higher U factor than, for example, stainless steel rods or stainless steel rods covered with silicone rubber tubing, other factors remaining constant one possible explanation of the influence of the surface condition on the U factor is the hydrophobic characteristic of the rod. While the mechanisms may not be understood fully or with certainty, conceptually this effect may be explained with reference to FIG. 8 where 32 represents a cross section of the wave front of the feed liquid stream being pushed by the rod. Since the rod rotates in the direction of arrow 62, there is the tendency for the rod to drag the fluid from the stream 32 into the gap between the rod and the tube. This would increase the thickness of the film and reduce the U factor. This tendency would be reduced by the hydrophobic property of the rod. In the production design, the cost of the rod and its endurance must also be considered to reach an optimum cost effectiveness.

In addition to its ability to increase the U factor, the whip rod is also very effective in minimizing the deposit 66 of solid particles (FIG. 7) upon the evaporation surface. Solid deposits tends to increase the thermal resistance of the evaporation side 14' and gradually lower the U factor. For sea water desalinization applications, the degradation of the U factor is markedly slower with the rod than without the rod. However, due to the precipitation characteristic of $CaCO_3$ it has been found that the orbital system works better with boiling temperatures substantially below 100° C. For example, at 68° C., the high U factor of the orbital system can be maintained indefinitely. To some degree the use of a small amount of an antiscaling agent also helps, but for sea water desalinization the combination of low temperature operation, fins, and whip rod is most effective to sustain the exceedingly high U factor, such as $U > 2000$ B.T.U/ft²-hr-° F., indefinitely. By way of comparison, those widely used evaporator type desalinization system such as multi-stage flash and horizontal tube exhibit a U factor in the range of 500 to 800. The evaporation system of FIG. 1 can include a vacuum condensing unit, shown schematically at V/C, to chill the vapor while removing the non condensible gas in order to operate below atmospheric pressure. Other standard measures can be taken such as the enclosure of the evaporator in an insulating compartment.

The effectiveness of the whip rod to remove the scale, or fouling in general, is also influenced by the flow rate of the stream of the feed liquid 32 in front of the whip rod. This stream must supply the liquid to wet the evaporation surface. An orbital evaporator requires much less flow rate of feed per surface area than other types of evaporators. However a minimum flow rate is needed to avoid the formation of dry spots for a given type of fluid and to carry away the fouling residues. This minimum flow rate is most critical at the lower end of the tube where the concentration or residue is high and the flow rate is the lowest. In system design it is convenient to treat the minimum flow rate at the lower end of the tube as an objective and then to choose a combination of other factors such as the concentration, tube length, the rate of evaporation, recirculation, etc. to accomplish the objective. Because the orbital evaporator requires a lower wetting rate than other types, once through evaporation can usually be accomplished. Once through operation cuts boiling point elevation losses, eliminates transfer pumps, and generally reduces system cost. However in some applications a recirculation arrangement as shown in FIG. 1 may be desirable. In this arrangement a concentrate outlet line 41 is pumped by pump 68 and is divided into two branches 69 and 70. Branch 69 serves as the outlet for the concentrate into the proper channel of the overall system in which the evaporator serves as a subsystem. Branch 70 recirculates a predetermined portion of the concentrate regulated by valve 71 back into a feed line 72 to the manifold 34. Recirculation is often used in traditional evaporation systems. For orbital evaporators the amount of recirculation (if needed) is much less than in traditional evaporation systems.

By way of illustration, but not of limitation, a typical evaporator 200 according to the present invention uses heat transfer tubes with a diameter of 1½ inch, a length of 4 to 5 feet, and a wall thickness of 0.035 inch. The tube is orbited at 400 r.p.m. with an excursion of about ⅜ inch. The throughput of feed liquid input through each tube 30 is about 0.2 l/min. There are 2 to 8 vertical fins each between 1/32 to ⅛ inch high. The free standing whip rod 31 of the present invention has a diameter in the range of ¼ to ½ inch and a length sufficient to extend generally the length of the associated tube 30 and extend below the tube to the support plate 52.

There has been described an improved orbital tube evaporator that reduces the condensate and gas barriers to lower the thermal resistance across the tube. The improved evaporator also uses a free-standing, unanchored whip rod to distribute the feed liquid in a thin film with a low cost of manufacture, good performance, and a high level of reliability. The whip rod also controls fouling to a degree that with proper temperature controls it is possible to operate the evaporator as a desalinization unit without periodic shut downs for cleaning solid deposits on the tube. The extremely high efficiency of the evaporator of this invention provides a high degree of evaporation over a relatively short length of tube. This leads to a compact design.

While the invention has been described with respect to its preferred embodiments, it will be understood that various modifications and alterations will occur to those skilled in the art. Such modifications and alterations are intended to fall within the scope of the appended claims.

What is claimed is:

1. In an orbital evaporator having a container with a vapor chamber and a condensation chamber formed therein, an inlet to the container for a feed liquid, an outlet for condensate from the container, at least one vertically oriented heat transfer tube mounted within the container so that the feed liquid can evaporate at the interior surface of said heat transfer tube to form a vapor stream by taking heat from the vapor stream condensing at the exterior surface of the heat transfer tube to form a condensate, means for regulating the equilibrium pressure to maintain a vapor temperature T in the heat transfer tube, means to supply vapor at a temperature $T + \Delta T$ at the condensation chamber, and means for driving said container and the tubes to revolve in an orbital motion that distributes the feed liquid over the interior surface of the heat transfer tube, the improvement comprising baffle means mounted on the exterior surface of said tube to collect and direct the condensate thereby reducing the thermal resistance $R_c$ across the tube due to the presence of the condensate on the exterior surface of the tube said baffle means comprising at least one fin mounted on the exterior surface of said heat transfer tube, said fin extending vertically and projecting radially from the surface of the tube to intercept the condensate moving with a horizontal component of motion along the exterior surface of the tube in response to orbital motion and to channel it downwardly towards the condensate outlet.

2. The improved orbital evaporator of claim 1 wherein there are a plurality of said fins mutually spaced around the tube.

3. In an orbital evaporator having a container with a vapor chamber and a condensation chamber formed therein, an inlet to the container for a feed liquid, an outlet for condensate from the container, at least one vertically oriented heat transfer tube mounted within the container so that the feed liquid can evaporate at the interior surface of said heat transfer tube to form a vapor stream by taking heat from the vapor stream condensing at the exterior surface of the heat transfer tube to form a condensate, means for regulating the equilibrium pressure to maintain a vapor temperature T in the heat transfer tube, means to supply vapor at a temperature $T+\Delta T$ at the condensation chamber, and means for driving said container and the tubes to revolve in an orbital motion that distributes the feed liquid over the interior surface of the heat transfer tube, the improvement comprising a whip rod located within the heat transfer tube, said whip rod moving over the interior surface of the heat transfer tube in response to the orbiting motion to distribute the feed liquid into a thin and uniformly distributed film to reduce the thermal resistance $R_e$ across the tube at its interior surface due to the presence of the liquid being evaporated, and plate means disposed under a lower end of the whip rod for supporting and vertically located said whip rod within the tube on one of its own ends in a free-standing manner, said whip rod being sufficiently stiff to remain generally vertical in said free-standing relationship and being free to roll about its own longitudinal axis over the interior surface of the tube and the feed liquid within the tube in response to the orbiting motion to produce said thin, uniformly distributed film.

4. The improved orbital evaporator of claim 3 wherein said whip rod has a circular transverse cross section and extends vertically over generally the full height of the tube.

5. The improved orbital evaporator of claim 4 wherein said whip rod is formed of a hydrophobic material.

6. The improved orbital evaporator of claim 5 wherein said material is Nylon.

7. The improved orbital evaporator of claim 3 further comprising temperature control means for the boiling temperature of said feed liquid, said temperature control means maintaining the temperature of said feed liquid at or below a preselected value which, in combination with the mechanical action of said whip rod as it rolls on the interior surface of the tube, controls the fouling of the interior surface.

8. The improved orbital evaporator of claim 7 wherein said feed liquid is sea water and further comprising at least one vertically extending and radially projecting fin mounted on the exterior surface of said tube to guide the condensate to the condensate outlet to reduce the thermal resistance $R_c$ across the tube due to the presence of the condensate, said evaporator being capable of operation for an indefinite period with a total heat transfer coefficient U of at least 2,000 BTU/ft$^2$-hr-°F.

9. The improved orbital evaporator of claim 3 further comprising means for removing non-condensible gases from the vapor.

10. The improved orbital evaporator of claim 7 wherein said feed liquid is sea water and further comprising at least one vertically extending and radially projecting fin mounted on the exterior surface of said tube to guide the condensate to the condensate outlet to reduce the thermal resistance $R_c$ across the tube due to the presence of the condensate, said evaporator being capable of operation for an indefinite period with a total heat transfer coefficient U of at least 1,500 BTU/ft$^2$-hr-°F.

* * * * *